United States Patent
Bouhours et al.

(10) Patent No.: US 10,919,044 B2
(45) Date of Patent: Feb. 16, 2021

(54) BLADE HOLDER FOR FOOD PROCESSOR

(71) Applicant: BEABA, Paris (FR)

(72) Inventors: Rodolphe Bouhours, Port (FR);
Laurent Noca, Hauterives (FR);
Marie-Gerard Merlet, Chateau Guibert (FR); Dany Gendre, Aizenay (FR);
Gilles Ouvrard, La Rohce sur Yon (FR)

(73) Assignee: BEABA, Paris (FR)

( * ) Notice: Subject to any disclaimer, the term of this patent is extended or adjusted under 35 U.S.C. 154(b) by 188 days.

(21) Appl. No.: 16/160,240

(22) Filed: Oct. 15, 2018

(65) Prior Publication Data

US 2019/0111439 A1    Apr. 18, 2019

(30) Foreign Application Priority Data

Oct. 13, 2017   (FR) ...................................... 1759600

(51) Int. Cl.
*B02C 18/18* (2006.01)
*A47J 43/07* (2006.01)
*B02C 18/12* (2006.01)

(52) U.S. Cl.
CPC ........... *B02C 18/18* (2013.01); *A47J 43/0716* (2013.01); *A47J 43/0722* (2013.01); *B02C 18/12* (2013.01)

(58) Field of Classification Search
CPC ...... B02C 18/18; B02C 18/12; A47J 43/0722; A47J 43/0716
USPC ...................................... 241/92, 282.1–282.2
See application file for complete search history.

(56) References Cited

U.S. PATENT DOCUMENTS

| | | | | |
|---|---|---|---|---|
| 2,530,455 A | * | 11/1950 | Forss | A47J 43/07 241/282.2 |
| 2,585,255 A | * | 2/1952 | Kochner | A47J 43/046 241/282.2 |
| 2,750,162 A | * | 6/1956 | Kircher | A47J 43/07 366/205 |
| 2,755,900 A | * | 7/1956 | Seyfried | F16D 3/68 192/55.2 |
| 2,804,289 A | * | 8/1957 | Schwaneke | A47J 43/046 366/197 |
| RE24,607 E | * | 2/1959 | Seyfried | F16D 3/68 192/55.2 |
| 2,940,738 A | * | 6/1960 | Posener | A47J 43/046 366/205 |

(Continued)

FOREIGN PATENT DOCUMENTS

| | | |
|---|---|---|
| CN | 201404117 Y | 2/2010 |
| DE | 10 2010 060 270 A1 | 5/2012 |

(Continued)

*Primary Examiner* — Faye Francis
(74) *Attorney, Agent, or Firm* — Oliff PLC

(57) ABSTRACT

A blade holder for a food processor, the blade holder including: at least one locking member, at least one blade, a support including at least one shaft, the blade being mounted on the support about the shaft, wherein the blade includes a central portion including a through-opening for the shaft of the support, the central portion of the blade including a first face, on which the support is positioned, and a second face, which is opposite the first face, which is configured to cooperate with a first seal positioned between the locking member and the central portion of the blade.

10 Claims, 5 Drawing Sheets

(56) References Cited

U.S. PATENT DOCUMENTS

Figure 1:
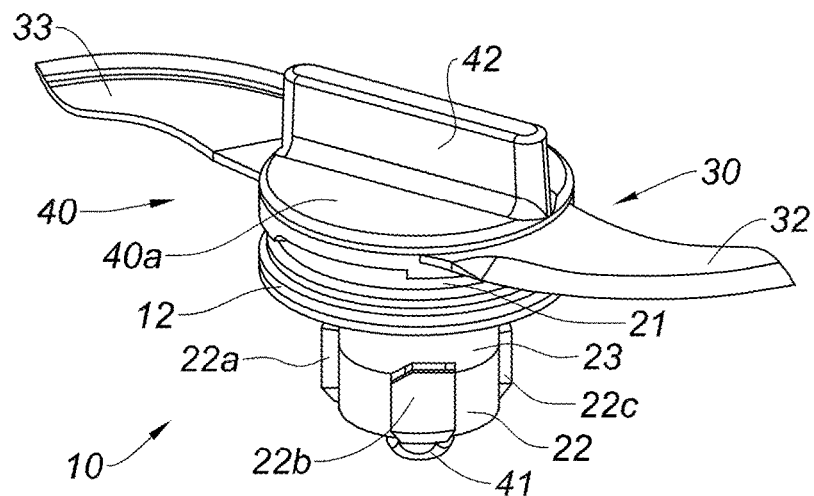

| | | | | |
|---|---|---|---|---|
| 2,992,715 | A * | 7/1961 | Blachly | F16D 3/12 |
| | | | | 192/69.71 |
| 3,064,949 | A * | 11/1962 | Dewenter | A47J 43/046 |
| | | | | 241/195 |
| 3,368,800 | A * | 2/1968 | Barnard, Jr. | A47J 43/046 |
| | | | | 241/282.2 |
| 3,421,742 | A * | 1/1969 | Swanke | A47J 43/046 |
| | | | | 241/282.2 |
| 3,612,126 | A * | 10/1971 | Emmons | B02C 23/04 |
| | | | | 241/199.12 |
| 4,462,694 | A * | 7/1984 | Ernster | B01F 7/00008 |
| | | | | 241/282.2 |
| 6,960,015 | B2 * | 11/2005 | Lee | A47J 43/0722 |
| | | | | 366/205 |
| 7,641,380 | B2 * | 1/2010 | Behar | A47J 43/0722 |
| | | | | 366/205 |
| 7,909,501 | B2 * | 3/2011 | Eden | A47J 43/0766 |
| | | | | 366/205 |
| 8,056,848 | B1 * | 11/2011 | Liang | A47J 43/0722 |
| | | | | 241/282.2 |
| 8,690,093 | B2 * | 4/2014 | Rukavina | B01F 7/0025 |
| | | | | 241/282.2 |
| 9,585,519 | B2 * | 3/2017 | Guo | A47J 43/0711 |
| 2002/0079393 | A1 | 6/2002 | Karkos et al. | |
| 2003/0214877 | A1 * | 11/2003 | Lin | A47J 43/0722 |
| | | | | 366/214 |
| 2005/0099884 | A1 * | 5/2005 | Lee | A47J 43/0722 |
| | | | | 366/205 |
| 2011/0096619 | A1 * | 4/2011 | Pryor, Jr. | A47J 43/0766 |
| | | | | 366/205 |
| 2012/0027331 | A1 * | 2/2012 | Liang | F16C 33/7886 |
| | | | | 384/477 |
| 2013/0264403 | A1 * | 10/2013 | Thai | A47J 43/046 |
| | | | | 241/191 |
| 2014/0239107 | A1 * | 8/2014 | Upston | A47J 43/0716 |
| | | | | 241/282.2 |
| 2015/0023130 | A1 * | 1/2015 | Foxlee | A47J 43/0722 |
| | | | | 366/205 |
| 2015/0117137 | A1 * | 4/2015 | Haney | A47J 43/046 |
| | | | | 366/142 |
| 2016/0331181 | A1 * | 11/2016 | Dickson, Jr. | B01F 7/162 |
| 2017/0295998 | A1 * | 10/2017 | Lee | A47J 43/085 |
| 2017/0354940 | A1 * | 12/2017 | Kolar | B01F 15/00435 |
| 2018/0008097 | A1 * | 1/2018 | Mehlman | B01F 7/1695 |
| 2018/0160855 | A1 * | 6/2018 | Krivos | B01F 13/047 |
| 2018/0168402 | A1 * | 6/2018 | Arnett | B01F 15/0048 |
| 2018/0168403 | A1 * | 6/2018 | Boozer | A47J 43/0722 |
| 2020/0170447 | A1 * | 6/2020 | Buttner | A47J 37/0623 |

FOREIGN PATENT DOCUMENTS

| | | |
|---|---|---|
| EP | 3 238 584 A1 | 11/2017 |
| EP | 3 289 940 A1 | 3/2018 |
| FR | 2 967 340 A1 | 5/2012 |
| WO | 2010/099721 A1 | 9/2010 |

* cited by examiner

BLADE HOLDER FOR FOOD PROCESSOR

This application claims priority to French Patent Application No. 17/59600 filed Oct. 13, 2017.

The present invention relates to the field of small electrical appliances intended for heating food containers and/or for cooking food and/or for preparing food. The invention applies preferably, although not exclusively, to the field of small electrical appliances for baby and toddler food.

Kitchen appliances such as food processors traditionally comprise a food preparation bowl which can also be used to cook food. For preparing food, the bowl traditionally comprises a blade configured to be driven in rotation by a rotary drive shaft provided in the bottom of the bowl. The blade is arranged on a blade holder which can either be integrated fixedly on the drive shaft or removably by a locking system.

Integrated blade holders have the disadvantage of not being removable, which means that cleaning the blades and the space between the blade holder and the bottom of the bowl is time-consuming and awkward. In addition, since the blade holders are permanent, it is not possible to change the blade in the event of a defect or of wear.

Removable blade holders are generally locked on the bottom of the bowl via a locking nut or a bayonet system. The advantage of these blade holders is that they are easy to change and they can be removed in order to clean the bottom of the bowl. However, these blade holders have the disadvantage of a complex structure, requiring a metallic surface on which the blade rests for friction, and comprise a plurality of seals and components that complicate their assembly.

The object of the invention is to overcome all or some of the aforementioned disadvantages by making available a removable blade holder that has a simplified structure.

To this end, the invention relates to a blade holder for a food processor intended at least for preparing food, the blade holder being configured to be positioned removably in a food processor bowl for preparing and/or cooking food, the blade holder comprising:
- at least one locking member configured to lock the blade holder in a bowl,
- at least one blade comprising at least one first knife and at least one second knife,
- a support comprising at least one shaft extending on a longitudinal axis of the blade holder, the blade being mounted on the support about the shaft, characterized in that the blade comprises a central portion from which the first knife and the second knife extend radially, the central portion of the blade comprising a through-opening for the shaft of the support, the central portion of the blade comprising a first face, on which the support is positioned, and a second face, which is opposite the first face and which is configured to cooperate with a first seal positioned between the locking member and the central portion of the blade.

The structure of the blade holder according to the invention is simplified, especially because the blade comprises a central portion serving as a washer, which makes it possible to do without a metallic surface for friction, and, by virtue of the configuration with a first seal, it is no longer necessary to have a first seal before and after the blade in order to ensure the leaktightness of the blade holder. Advantageously, the central portion of the blade serves as a metallic washer which is resistant to the friction and heat that result from the rotation of the blade holder.

Advantageously, the configuration of the blade with two knives makes it possible to improve the efficacy of cutting of the food in the bowl.

According to an embodiment of the invention, the second knife extends radially from the central portion of the blade in a different direction, preferably the opposite direction to that in which the first knife extends.

According to an embodiment of the invention, the second knife is arranged symmetrically to the second knife with respect to the central portion of the blade. Thus, the cutting of the food is more effective, and this symmetrical configuration balances the blade.

According to an embodiment of the invention, the blade can comprise a plurality of knives, the knives being balanced around the central portion.

According to an embodiment of the invention, the blade is overmoulded or mounted with a force fit on the shaft of the support.

According to an embodiment of the invention, the blade is made of metal, preferably of steel.

According to an embodiment of the invention, the central portion of the blade is mounted rigidly and permanently on the support.

According to an embodiment of the invention, the central portion of the blade is overmoulded in the support.

According to an embodiment of the invention, the support comprises a first portion on which the shaft is provided, said first portion being arranged opposite the second face of the blade in the assembled state of the blade holder.

According to an embodiment of the invention, the support additionally comprises a gripping member arranged on the first portion of the support. The gripping member advantageously allows the blade holder to be manipulated and withdrawn from the bowl without risk of injury.

According to an embodiment of the invention, the gripping member is in the form of a projecting rib, preferably of rectangular shape, extending from the first portion along the longitudinal axis of the blade holder.

According to an embodiment of the invention, the shaft is configured to be rotated with respect to the locking member by a drive shaft in the bowl.

According to an embodiment of the invention, the locking member comprises at least one upper portion comprising a first face shaped to receive the first seal.

According to an embodiment of the invention, the upper portion of the locking member additionally comprises a receiving groove shaped so as to accommodate at least one second seal, said receiving grooves being arranged in a second face of the upper portion, opposite the first face.

According to an embodiment of the invention, the locking member comprises a lower portion shaped so as to cooperate with a part of the bowl for preparing and/or cooking food.

According to an embodiment of the invention, the lower portion comprises at least one first deformation and at least one second deformation, each configured to cooperate with a complementary shape provided on the bowl for preparing and/or cooking food, the first deformation and the second deformation each being part of a bayonet locking system.

According to an embodiment of the invention, the lower portion comprises a third deformation configured to cooperate with a complementary shape provided on the bowl for preparing and/or cooking food, the third deformation being part. Advantageously, the lower portion is shaped so as to lock onto the bowl via a bayonet system of which the first, the second and the third deformation form part. This system makes it possible to secure the blade holder on the bowl and also to remove it easily from the bowl.

According to an embodiment of the invention, the locking member comprises a central portion, positioned between the upper portion and the lower portion.

According to an embodiment of the invention, the first seal is configured to provide the leaktightness between the shaft of the support and the locking member.

According to an embodiment of the invention, the first seal is arranged on the second face of the blade and is a lip seal. Advantageously, the first lip seal makes it possible to adapt to the height tolerances of the bowl.

According to an embodiment of the invention, the blade holder additionally comprises a second seal configured to provide the leaktightness between the blade holder and the bowl for preparing and/or cooking food.

According to an embodiment of the invention, the second seal is a lip seal or an O-ring seal or flat seal.

According to an embodiment of the invention, the locking member comprises a first bore shaped to accommodate the shaft of the support. Alternatively, the locking member can comprise a pain bearing configured to accommodate the shaft of the support.

According to an embodiment of the invention, the locking member comprises a second bore adjacent to the first bore, the second bore being shaped to accommodate a locking flange.

According to an embodiment of the invention, the second bore is provided at least in the lower portion of the locking member.

According to an embodiment of the invention, the blade holder comprises a locking flange configured to block the vertical translation of the shaft of the support.

Figure 2:
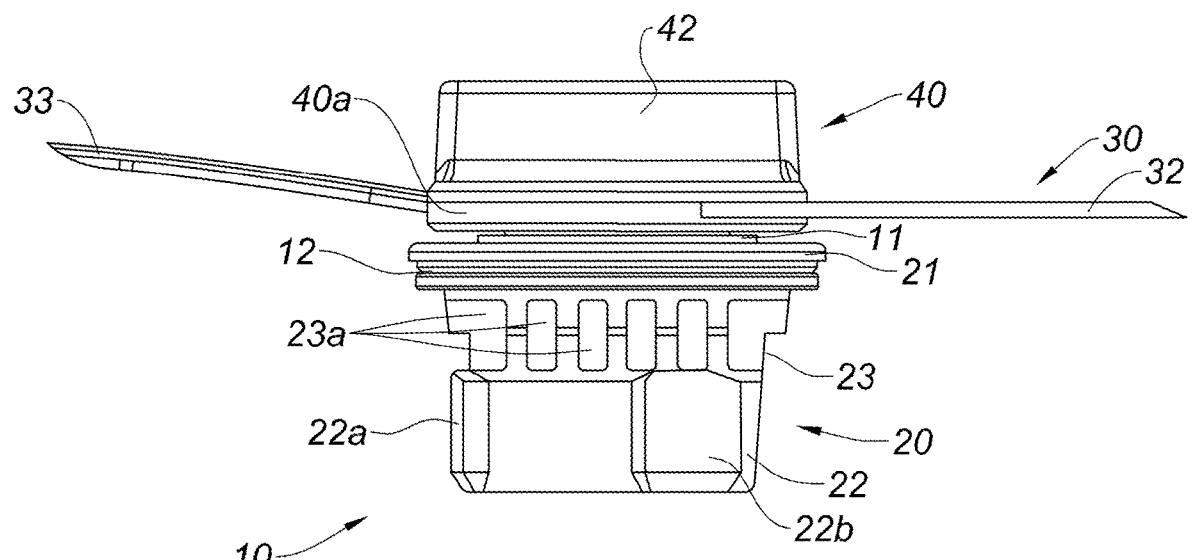
Figure 3:
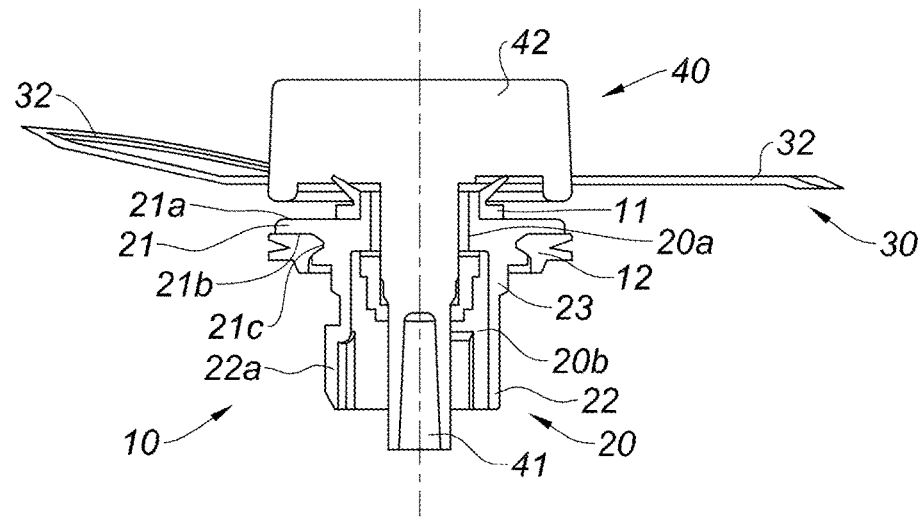
Figure 4:
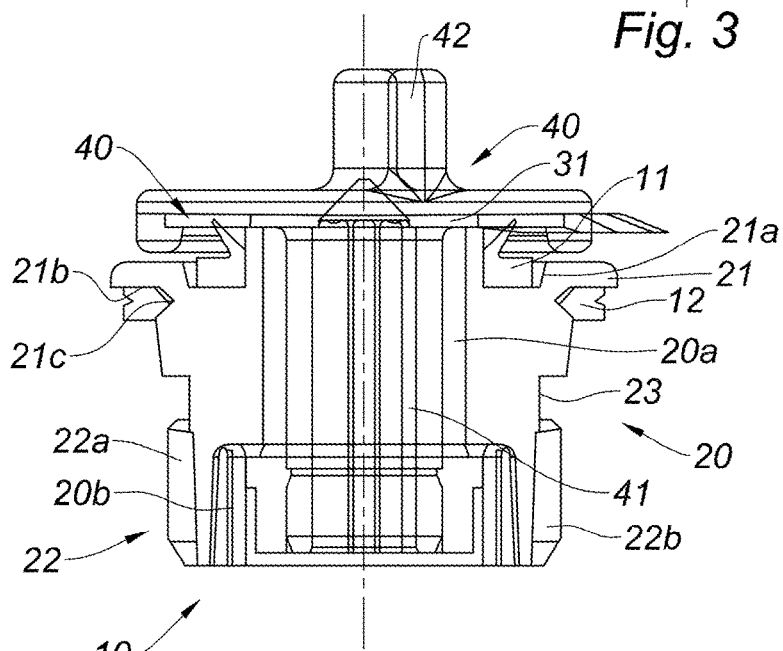
Figure 5:
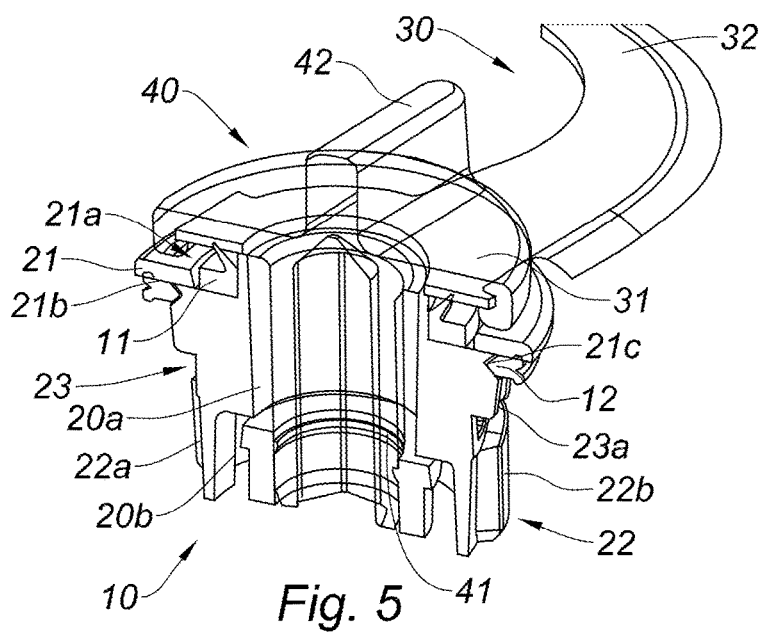
Figure 6:
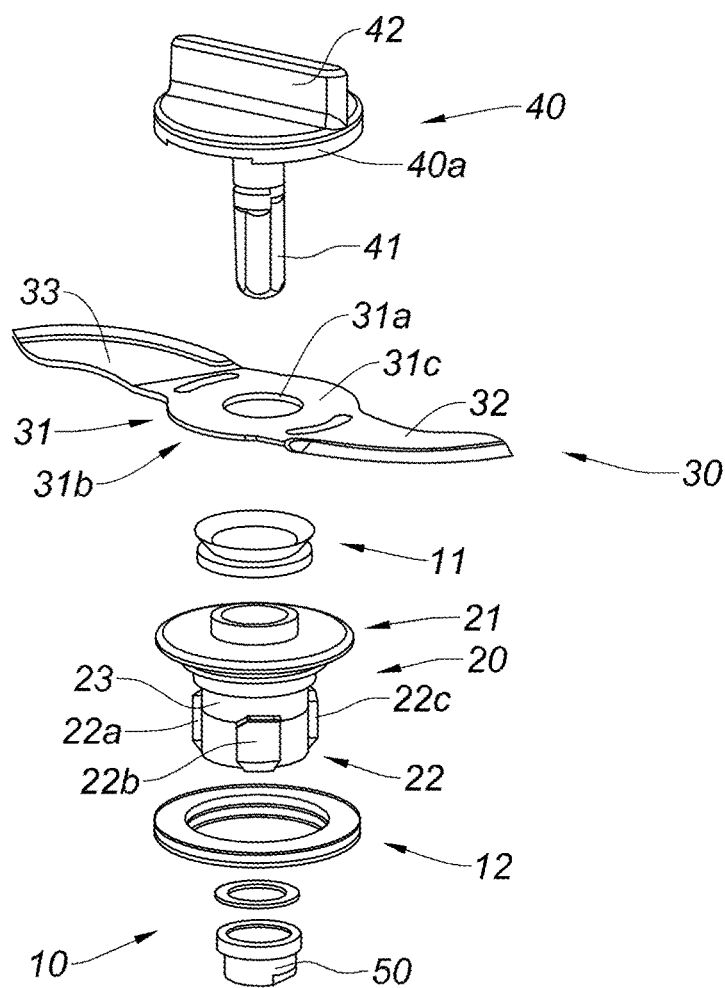
Figure 7:
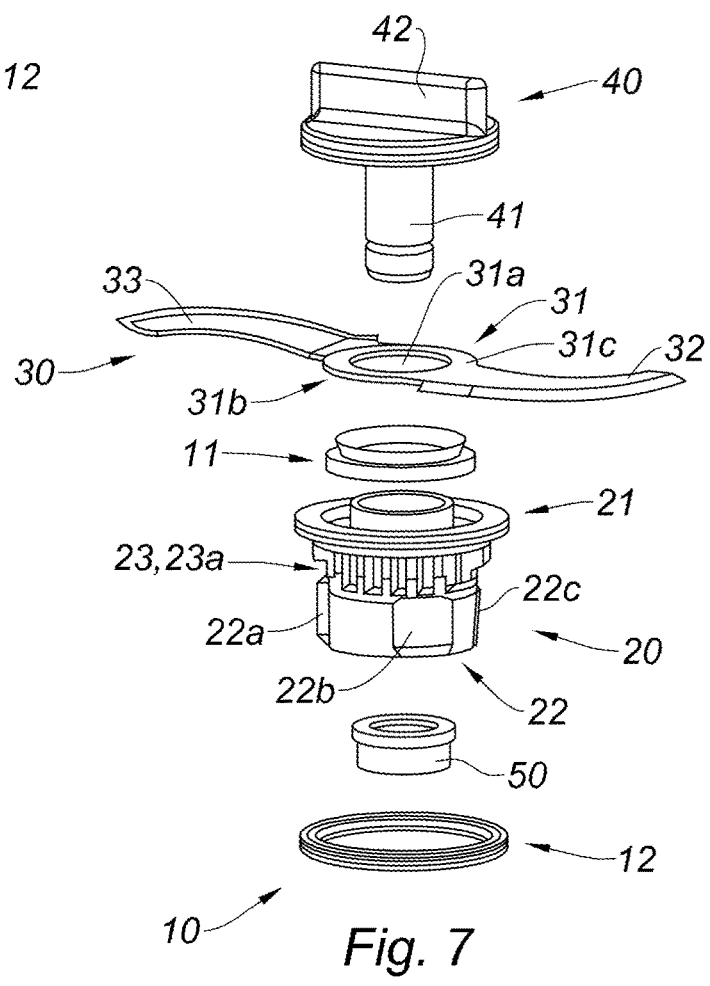
Figure 8:
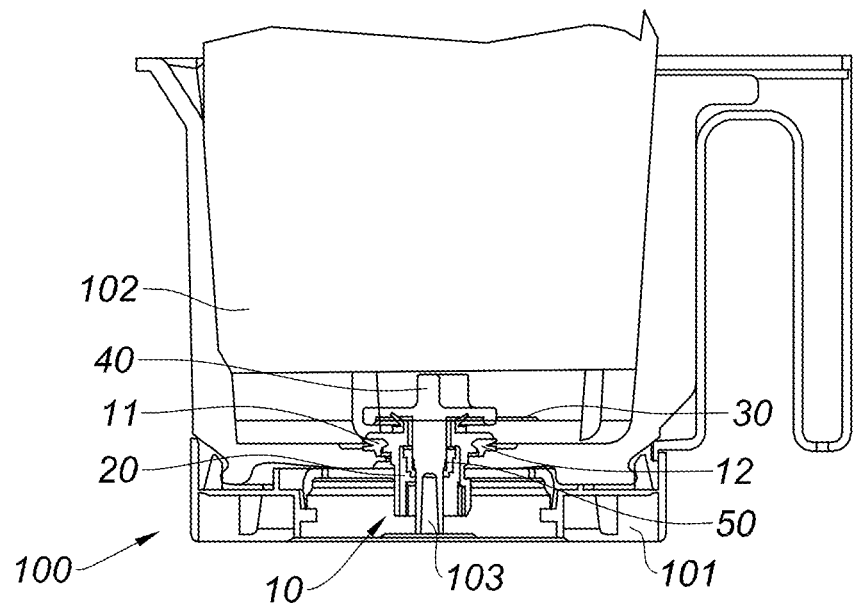
Figure 9:
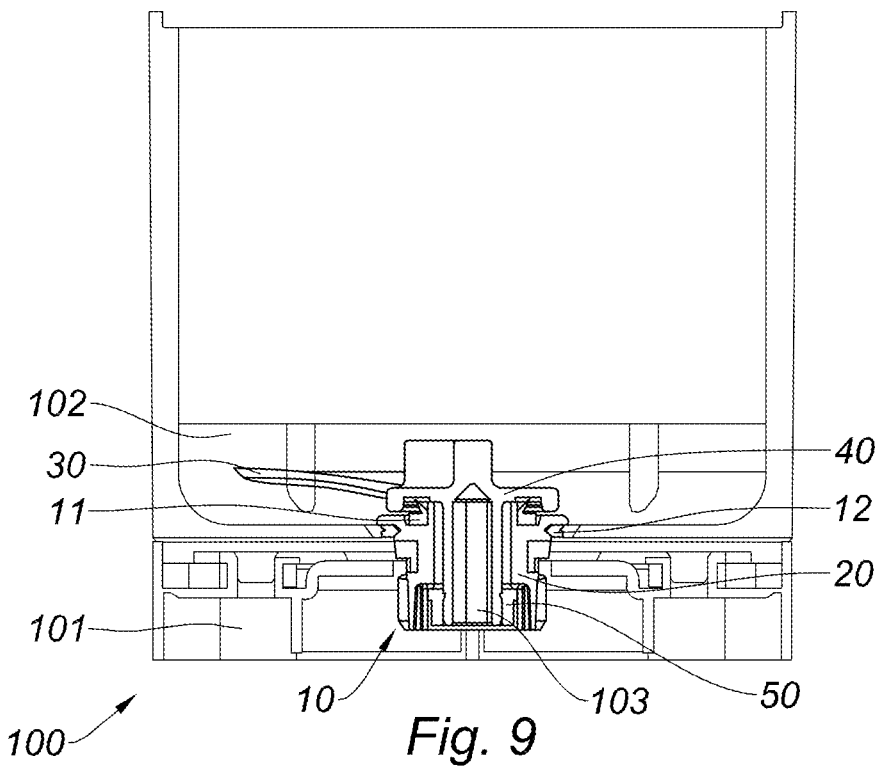
Figure 10:
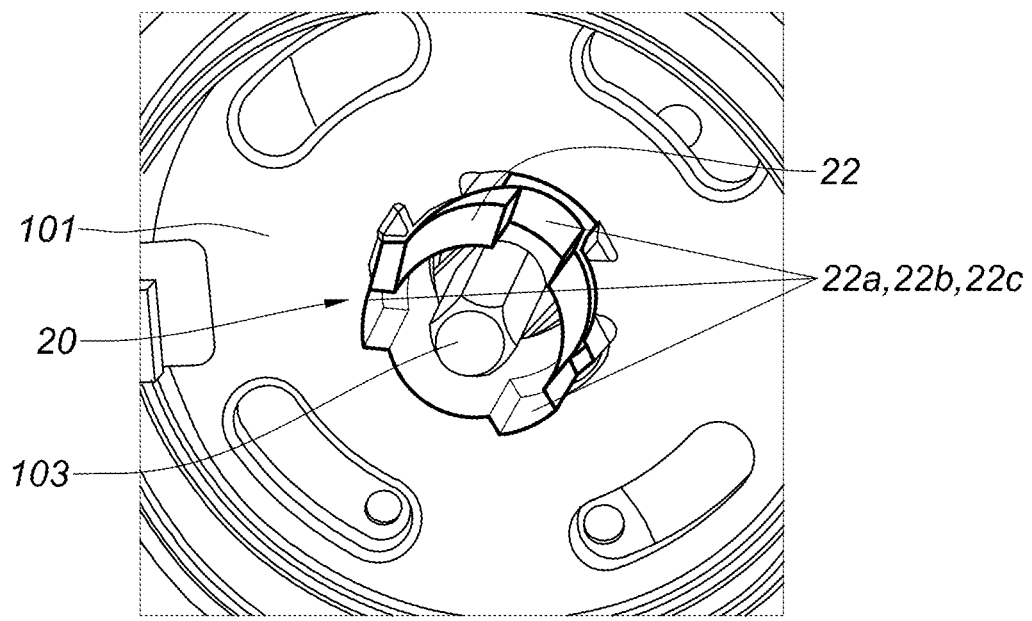
Figure 11:
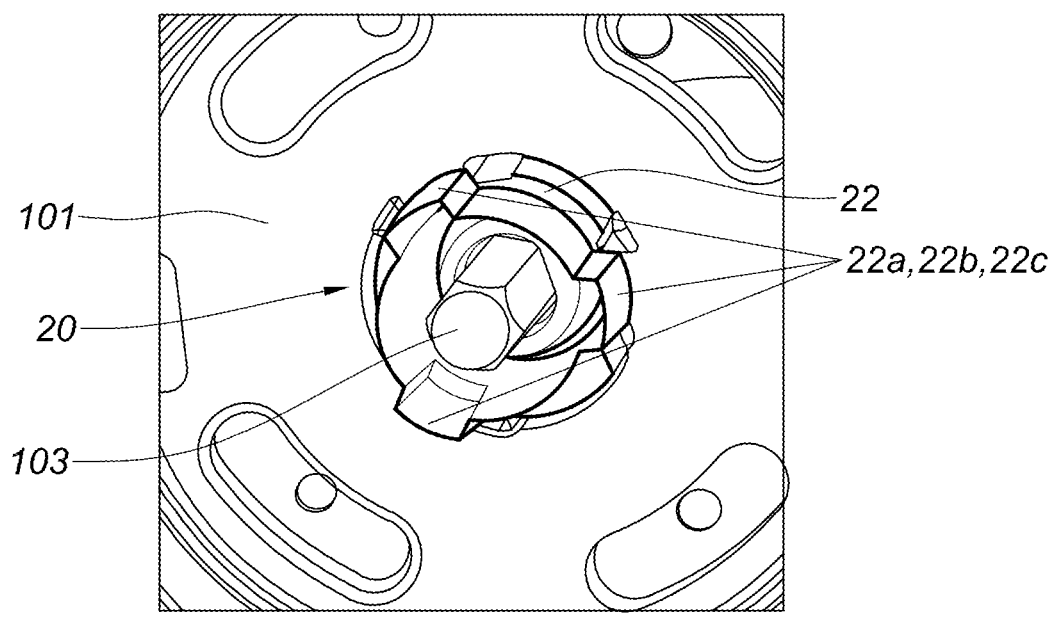

The invention will be better understood from the following description of embodiments of the present invention that are given as non-limiting examples and that are explained with reference to the attached schematic figures. The attached schematic figures are listed below:

FIG. 1 is a perspective view of the blade holder according to a first embodiment of the invention, FIG. 2 is a front view of the blade holder according to a second embodiment of the invention, FIG. 3 is a front view, in longitudinal section, of the blade holder shown in FIG. 1, FIG. 4 is a front sectional view of the blade holder shown in FIG. 2, FIG. 5 is a perspective view, in longitudinal section, of the blade holder shown in FIG. 2, FIG. 6 is an exploded perspective view of the blade holder shown in FIG. 1, FIG. 7 is an exploded perspective view of the blade holder shown in FIG. 2, FIG. 8 is a sectional view of a food processor bowl comprising the blade holder according to the first embodiment, FIG. 9 is a sectional view of a food processor bowl comprising the blade holder according to the second embodiment, FIG. 10 is a sectional bottom view of the kitchen bowl in which the locking member is in the locked position, and FIG. 11 is a sectional bottom view of the kitchen bowl in which the locking member is in the unlocked position.

Whichever the embodiment, the blade holder 10 according to the invention is a blade holder 10 for a food processor intended at least for preparing food. More particularly, the blade holder 10 is configured to be positioned removably in a food processor bowl 100 for preparing and/or cooking food, as is illustrated in FIGS. 8 and 9.

Whichever the embodiment, the blade holder 10 comprises at least one locking member 20 configured to lock the blade holder 10 in the bowl 100. The locking member 20 comprises at least one upper portion 21 comprising a first face 21*a* shaped so as to receive a first lip seal 11, as is illustrated in FIGS. 3, 4 and 5. According to the invention, the first seal 11 is configured to provide the leak tightness between the shaft 41 of the support 40 and the locking member 20.

As can be seen in particular in FIGS. 3, 4 and 5, the upper portion 21 of the locking member 20 additionally comprises a receiving groove 21*c* shaped to accommodate at least one second seal 12, said receiving groove 21*c* being arranged at a second face 21*b* of the upper portion 21, opposite the first face 21*a*.

Whichever the embodiment, the locking member 20 comprises a lower portion 22 shaped to cooperate with a part of the bowl 100 for preparing and/or cooking food, as is illustrated in FIGS. 8 to 11. As can be seen in particular in FIGS. 6 and 7, and whichever the embodiment, the lower portion 22 comprises at least one first deformation 22*a* and at least one second deformation 22*b*, each configured to cooperate with a complementary shape (not shown) provided on the bowl 100 for preparing and/or cooking food, the first deformation 22*a* and the second deformation 22*b* each being part of a bayonet locking system. In addition, the lower portion 22 comprises a third deformation 22*c* configured to cooperate with a complementary shape provided on the bowl 100 for preparing and/or cooking food, as is illustrated in FIGS. 10 and 11.

In the examples shown in FIGS. 6 and 7, and whichever the embodiment, the locking member 20 comprises a central portion 23 positioned between the upper portion 21 and the lower portion 22.

Whichever the embodiment, the locking member 20 comprises a first bore 20*a* shaped to accommodate the shaft 41 of the support 40, which will be described further below in the description, and a second bore 20*b* adjacent to the first bore 20*a*, the second bore 20*b* being shaped to accommodate a locking flange 50 configured to block the vertical translation of the shaft of the support, as is illustrated in particular in FIGS. 3 to 5, 8 and 9. In a variant not shown, the first bore can be a plain bearing.

Whichever the embodiment, the blade holder 10 additionally comprises at least one blade 30 comprising a central portion 31 from which a first knife 32 extends radially, the central portion 31 comprising a through-opening 31*a* configured to cooperate with the shaft 41 of a support 40 of the blade holder 10, the central portion 31 comprising a first face 31*b*, on which the support 40 is positioned, and a second face 31*c*, which is opposite the first face 31*b* and which is configured to cooperate with the first seal 11, positioned between the locking member 20 and the central portion 31 of the blade 30. In addition, and as illustrated in particular in FIGS. 1, 2, 3, 6 and 7, the blade 30 comprises a second knife 33 extending radially from the central portion 31 of the blade 30 in a different direction, preferably the opposite direction to that in which the first knife 32 extends.

Whichever the embodiment, the blade holder 10 additionally comprises at least one support 40 comprising at least one shaft 41 on a longitudinal axis X-X of the blade holder 10, the blade 30 being mounted on the support 40 about the shaft 41, as is illustrated in particular in FIGS. 6 and 7. The support 40 comprises a first portion 40*a*, on which the shaft 41 is provided, said first portion 40*a* being arranged opposite the second face 31*c* of the central portion 31 of the blade 30 in the assembled state of the blade holder 10. As can be seen in particular in FIGS. 1 and 2, the support 40 additionally comprises a gripping member 42 arranged on the first portion of the support 40 or, more particularly, the gripping member 42 is mounted on the shaft 41. As can be seen in the examples illustrated, the gripping member 42 is in the form of a projecting rib, preferably of rectangular shape, extending from the first portion 40*a* of the support 40 along the longitudinal axis X-X of the blade holder 10.

Whichever the embodiment, the shaft 41 is configured to be rotated with respect to the locking member 20 by a drive shaft 103 in the bowl 100, as is shown in FIGS. 8 and 9. Advantageously, the rotation can be effected by the blade holder 10 being mounted with play or else being mounted with a plain bearing.

Whichever the embodiment, the blade holder 10 comprises a second seal 12 configured to provide the leak tightness between the blade holder 10 and the bowl 100 for preparing and/or cooking food, as is illustrated in FIGS. 8 and 9 for example. In the examples illustrated in FIGS. 1 to 9, the second seal is a lip seal.

Of course, the invention is not limited to the embodiments described and shown in the attached figures. Modifications remain possible, especially from the point of view of the set-up of the various elements or by substitution of technical equivalents, without thereby departing from the scope of protection of the invention.

The invention claimed is:

1. Blade holder for a food processor intended at least for preparing food, the blade holder being configured to be positioned removably in a food processor bowl for preparing and/or cooking food, the blade holder comprising:
    at least one locking member configured to lock the blade holder in the bowl,
    at least one blade comprising at least one first knife and at least one second knife,
    a support comprising a shaft extending on a longitudinal axis of the blade holder, the blade being mounted on the support about the shaft,
    wherein the at least one blade comprises a central portion from which the first knife and the second knife extend radially, the central portion of the at least one blade comprising a through-opening for the shaft of the support, the central portion of the at least one blade comprising a first face, on which the support is positioned, and a second face, which is opposite the first face and which is configured to cooperate with a seal positioned between the locking member and the central portion of the at least one blade.

2. Blade holder according to claim 1, in which the seal is arranged on the second face of the at least one blade and is a lip seal.

3. Blade holder according to claim 1, in which the central portion of the at least one blade is mounted rigidly and permanently on the support.

4. Blade holder according to claim 1, in which the central portion of the at least one blade is overmoulded in the support.

5. Blade holder according to claim 1, in which the support additionally comprises a gripping member arranged on a portion of the support.

6. Blade holder according to claim 1, in which the locking member comprises a lower portion shaped so as to cooperate with a part of the bowl for preparing and/or cooking food.

7. Blade holder according to claim 6, in which the lower portion comprises at least one first deformation and at least one second deformation, each configured to cooperate with a complementary shape provided on the bowl for preparing and/or cooking food, the first deformation and the second deformation each being part of a bayonet locking system.

8. Blade holder according to claim 7, in which the lower portion comprises a third deformation configured to cooperate with a complementary shape provided on the bowl for preparing and/or cooking food, the third deformation being part of the bayonet locking system.

9. Blade holder according to claim 1, additionally comprising a second seal configured to provide leaktightness between the blade holder and the bowl for preparing and/or cooking food.

10. Blade holder according to claim 1, comprising a locking flange configured to block vertical translation of the shaft of the support.

* * * * *